Figure 1:
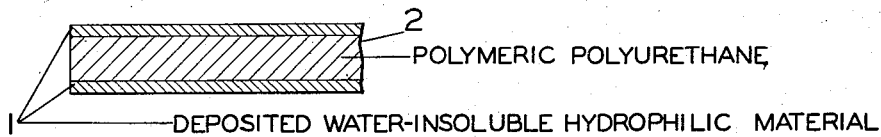

Aug. 18, 1959  W. R. POWERS ET AL  2,900,278
CELLULAR PRODUCT AND METHOD OF MAKING THE SAME
Filed June 15, 1956

INVENTORS:
WILLIAM R. POWERS
ROBERT A. VOLZ

BY Howson & Howson
ATTYS.

United States Patent Office 2,900,278
Patented Aug. 18, 1959

2,900,278

CELLULAR PRODUCT AND METHOD OF MAKING THE SAME

William R. Powers, Pennsgrove, N.J., and Robert A. Volz, Philadelphia, Pa., assignors to Scott Paper Company, Chester, Pa., a corporation of Pennsylvania Application June 15, 1956, Serial No. 591,533

10 Claims. (Cl. 117—98)

The present invention relates to the preparation, from foamed polymeric polyurethanes, of open-cell, cellular structures of improved spongiform characteristics, especially of improved hydrophilicity and capillaractive effect toward water, and, in one embodiment, having high wiping properties, and to the resulting product.

Open-cell, cellular structures of foamed polymeric polyurethanes are well known. The preparation of these materials includes as one step the reacting of a polyglycol, for example an alkyd resin, with an organic polyisocyanate to provide polymers characterized chemically by having recurring urethane linkages connecting linear units containing hydrocarbon groups of varying carbon contents and chain lengths which may be interrupted by carboxylic ester (alkyd resin type), ether, or other stable linkages. During or subsequent to polyurethane polymer formation gas is caused to develop which results in foaming of the polymer. These foamed products have been referred to as polyurethane foams, isocyanate type foams, Moltoprene foams and Desmodur-Desmophen type systems. Foamed products of this type are described in German Plastics Practice published by Debell and Richardson, 1946, Chapter XXI, "Plastic Foams," pages 462–465, and the chemical structures of these products are described in Angewandte Chemie, volume LXII, No. 3, pages 57–66 (1950).

Such foamed polymeric polyurethane products generally possess high tear-strength and varying degrees of softness and porosity depending upon the procedure employed in their preparation. These products are also resistant to many chemicals and bacterial action, and can be prepared in a wide variety of shapes, sizes and colors. However, while these products are sometimes described in the literature as sponge-like, with reference to their cellular structure, they are of a hydrophobic character and do not imbibe and hold water like a natural sponge.

There are available, of course, various types of sponge-like materials on the market, for example, rubber sponge, regenerated cellulose sponge, partially formalized polyvinylalcohol sponge and natural sponge. None of these commercial sponges, however, are free from certain disadvantages which seriously limit their utility. For example, rubber sponges are relatively hydrophobic, are subject to attack by ozone and have relatively poor strength; regenerated cellulose sponges, while capable of imbibing and holding water, are stiff when dry and are readily subject to bacterial attack and consequently disintegrate within a short time upon usage; partially formalized polyvinyl-alcohol sponges are boardlike and rigid when dry and have limited resistance to chemicals; and natural sponges are expensive, are subject to chemical and bacterial attack and, their size, shape and texture are limited.

It is the principal object of the present invention to provide improved open-celled, cellular structures, of the foamed polymeric polyurethane type, of low density and possessing high tear-strength and a high degree of hydrophilicity and capillaractive effect toward water.

Another object of the present invention is to provide a novel method for preparing such open-cell, cellular structures of improved hydrophilicity and capillaractive effect from normally hydrophobic foamed polymeric polyurethanes.

A further object is to provide a simple method for converting normally hydrophobic open-cell, cellular structures of foamed polymeric polyurethanes into sponge-like products possessing a high degree of hydrophilicity and capillaractive effect toward water rendering them capable of imbibing and holding large quantities of water.

A further object is to provide a simple method for improving the hydrophilicity and water capillaractivity of foamed polymeric polyurethanes which prior to the treatment of the present invention have varying lower degrees of hydrophilicity and water capillaractivity.

Still another object is to provide a sponge-like device of the type described which is highly resistant to bacteria and household chemicals, has high tear strength, possesses a high degree of hydrophilicity and capillaractive effect toward water and which can be prepared in a variety of sizes, shapes and colors.

A specific object is to provide a sponge-like device of the type described which is capable of imbibing, like a chamois, dispersed water droplets from a surface.

Figure 2:
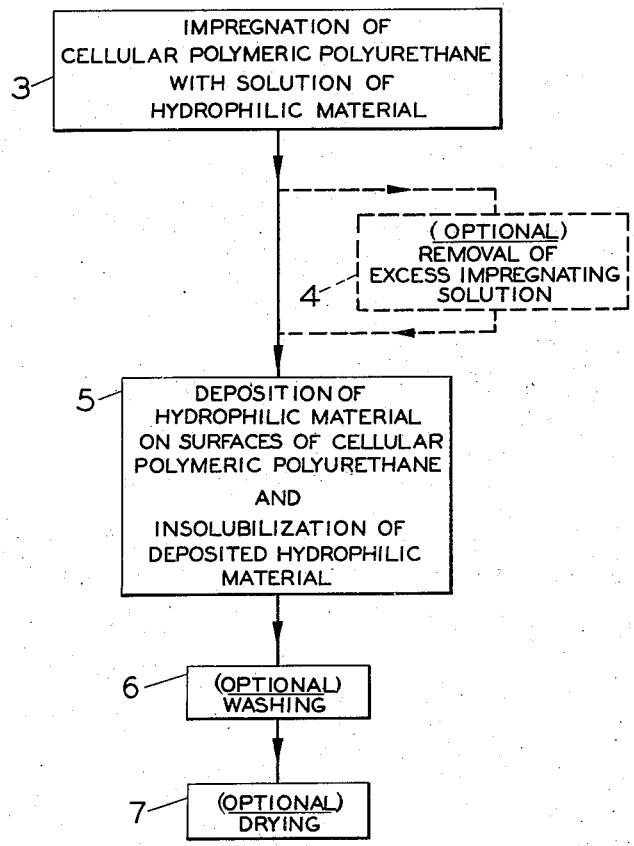

Other objects will become apparent from a consideration of the following specification and claims, when taken in conjunction with the accompanying drawing, wherein:

Figure 1 is a diagrammatic cross-section, on an enlarged scale, of a coated polymeric polyurethane of the present invention; and Figure 2 is a flow diagram illustrating the process of coating a foamed polymeric polyurethane structure in accordance with the present invention.

In copending application Serial No. 591,623, filed June 15, 1956, and in copending application Serial No. 655,368, filed April 26, 1957, there is disclosed and claimed a novel method for altering the physical properties of open-cell, cellular structures of foamed polymeric polyester polyurethanes, (which in their unaltered state are normally hydrophobic and do not imbibe water) including softness, density and hydrophilicity and water capillaractivity. This method involves the partial hydrolytic saponification of the polymeric polyester polyurethane in the form of a foamed open-cell, cellular structure. It has been found, in accordance with the invention of that copending application, that the subjection of a mass of foamed polymeric polyester polyurethane to hydrolytic saponification reagents and conditions, common to such hydrolytic saponification procedures for hydrolyzing carboxylic esters in general, will convert the polymeric polyester polyurethane, from a relatively hard, hydrophobic material, to a cellular structure of increased softness, of increased hydrophilicity, and capillaractivity, of decreased density, or of combination of these altered physical properties. The exact degree to which softness, density and hydrophilicity and capillaractivity are altered, or one made predominant over the others, depends upon the particular hydrolyzing conditions selected. The hydrophilicity of foamed polymeric polyester polyurethanes, which is normally in the neighborhood of about 10% (according to the measure hereinafter set forth) can be readily increased to above about 40%, and up to as high as about 80–90% by that method. The method of the present invention is applicable to the improved products of said copending application as well as to open-cell, cellular structures of foamed polymeric polyurethanes which have not received any such treatment and which are, therefore, in their usual hydrophobic condition.

The method of the present invention comprises coating the surfaces of an open-cell, cellular structure of foamed polymeric polyurethane with a substantially water-insoluble hydrophilic material. This is most readily accomplished by impregnating the open-cell, cellular structure of foamed polymeric polyurethane with a solution of a hydrophilic material capable of wetting the cell surfaces of said foamed polymeric polyurethane, and depositing the hydrophilic material, in water-insoluble form, on the external and internal cell surfaces of said structure.

The above-described foamed polymeric polyurethanes in their initial condition are, as stated, hydrophobic, and therefore the cell surfaces are incapable of being wetted by water; however, since the foamed polymeric polyurethanes are organophilic, the cell surfaces thereof can be readily wetted by organic liquids or mixtures of water and organic liquids or other organic compounds imparting wettability. The hydrophilicity of foamed polymeric polyester polyurethanes can be increased in accordance with the procedure of copending application Serial No. 591,623, and such increase may even be to the point where the cell surfaces can be readily wetted by water. Between these extremes of substantially complete hydrophobicity, on the one hand, and water wettability, on the other hand, products can be prepared according to the process of said copending application which have varying degrees of hydrophilicity and water capillaractivity. By appropriate proportions of organic liquids and water, or in the case of the more hydrophilic cellular structures, of surface active wetting agents and water, solutions can be prepared which will readily wet the cell surfaces of these cellular starting products. The present invention, therefore, employs a solution of a hydrophilic material, which solution will wet the cell surfaces of the foamed polymeric polyurethane being treated.

When an organic liquid is used as the solvent for the hydrophilic material or is mixed with water to provide an organo-aqueous solvent system, the organic liquid is preferably polar, although non-polar compounds, such as hydrocarbons, like hexane, and chlorinated hydrocarbons, like carbon-tetrachloride, may be employed, and, for ease of removal from the impregnated material, is preferably volatile. In addition, the organic liquid is preferably one which has a swelling action on the foamed polymeric polyurethane. Examples of suitable organic liquids are the ketones, such as acetone, methyl ethyl ketone, diethyl ketone, and the like; the alcohols, such as methanol, ethanol, isopropanol, and the like; acids, such as acetic acid, and the like; amides, such as formamide, dimethyl formamide, and the like. Compatible mixtures of two or more such liquids, either by themselves or with water may be employed. Suitable organic liquid-water mixtures are acetone and water, dimethyl formamide and water, and the like. Herein, where an organic liquid, either by itself or in an organo-aqueous mixture is relied upon for wetting of the cell surfaces of the foamed polyurethane, such solutions are referred to herein as organic solvent systems.

When the foamed polymeric polyurethane to be treated initially has a substantial hydrophilicity, such as in the range of 80–90%, according to the measuring procedure hereinafter set forth, an organic liquid need not be employed in order to secure wetting. The hydrophilic material may be dissolved as an aqueous solution which may contain an acidic or basic agent, depending upon the nature of the hydrophilic material, to insure dissolution thereof. If desired, however, a surface active wetting agent or hydrotropic salt like sodium xylene sulfonate may be included in the solution to improve wetting of the cell surfaces.

It will be seen from the foregoing that the principal functions of the solvent selected are to serve as a carrying medium for transporting the hydrophilic material into the cellular structure and to coat the internal cell surfaces thereof through dissolution of the hydrophilic material and wetting of the internal cell surfaces. Therefore, colloidal solutions and dispersions are included herein in the term "solution." Hence, for any hydrophilic material selected and any open-celled, foamed polymeric polyurethane mass treated, no difficulty will be presented in formulating a suitable impregnating solution bearing in mind the principles set forth herein.

The hydrophilic materials employed will be either initially insoluble in water or of a type that can be deposited in water-insoluble form. By "hydrophilic material" is meant a material that has an advancing contact angle against water of less than about 60°. Since lower contact angles indicate higher hydrophilicity, preferably the hydrophilic material employed will have an advancing contact angle against water of less than about 45°.

Examples of suitable hydrophilic materials for use especially with organic solvent systems are the partially hydrolyzed cellulose esters, such as partially hydrolyzed cellulose formates and acetates; partially saponified polyvinyl acetate; hydrophilic mixed ethers of cellulose, such as the hydrophilic ethyl hydroxyethyl celluloses, and the like; and the maleic acid-styrene interpolymers, such as described in U.S. Patent 2,205,882. Of these, the partially hydrolyzed cellulose acetates having an acetyl content between about 20% and about 30% and the maleic acid-styrene interpolymers are preferred.

Examples of suitable hydrophilic materials for use especially with aqueous solutions, or in solutions containing no more than a minor proportion of organic liquid, are hydroxyethyl cellulose, sodium cellulose xanthate (viscose), polyvinyl alcohol, carboxymethyl cellulose, and the like. In the case of hydroxyethyl cellulose and carboxymethyl cellulose, a basic agent, such as sodium hydroxide, advantageously is included to insure solubility in the aqueous impregnating solution.

The hydrophilic material may initially be in a water-soluble form as it exists in the impregnating solution. In such case, the hydrophilic material is subsequently treated to transform it into water-insoluble form. The exact mode of treatment will depend, of course, upon the nature of the hydrophilic material. For example, hydroxyethyl cellulose, sodium cellulose xanthate and the maleic acid-styrene interpolymers can be converted to substantially water-insoluble form by treatment with an acidic material; polyvinyl alcohol may be insolubilized by conversion in situ as a film to polyvinyl formal by treatment of the coating with formaldehyde and acid, e.g. sulfuric acid, and carboxymethyl cellulose may be insolubilized toward water by treatment of the coating in situ with cross-linking agents, such as glyoxal, melamine-formaldehyde and the like.

The process of the present invention is essentially a coating operation as illustrated in the flow diagram of Figure 2, a solution of the coating material, namely, the hydrophilic material, being employed for impregnation of the cellular polymeric polyurethane 2 to gain access to the voids within the cellular structure (in step 3). Mere immersion of the cellular polyemric polyurethane mass 2 in the solution of hydrophilic material can result eventually in penetration of the solution into the voids within the mass since the cellular structure is "open-celled" and is optionally followed by a removal of the excess impregnating solution (step 4) from the foam prior to the deposition and/or insolubilization of the coating material thereon (step 5). However, to facilitate impregnation, the cellular polymeric polyurethane mass is preferably mechanically worked, as by kneading, while immersed in the solution. The process also includes as optional operations a washing (step 6) and a final drying (step 7) of the coated foam.

The cells of the open-cell, cellular foamed polymeric polyurethane masses have been found to be generally in the form of dodecahedrons with each of the twelve faces representing generally a pentagon. This is a general rule, and throughout any cellular foamed polyurethane mass cell structures representing slight variations from this will be found. At any rate, each cell contains corners in which impregnating solution tends to gather instead of evenly coating the entire cell surface. The extent to which this occurs depends upon certain factors which may be borne in mind during the present treatment. The greater the wettability of the impregnating solution for polyurethane product itself, that is the lower the contact angle the solution has on a flat surface of polyurethane product, the smaller the tendency for the solution to gather preferentially in the cell corners. As seen from the foregoing, the wetting power of the solution toward polyurethane product can be controlled through the use of organic liquids and of surface active wetting agents. The amount of impregnating solution permitted to remain in the foamed mass just prior to deposition of the film also has an effect upon the tendency of the impregnating solution to gather at the corners. The greater the amount of solution in the mass, the less is the tendency to gather in the corner. The amount of solution permitted to remain in the mass can be easily controlled by the extent to which excess solution is removed, as by squeezing the impregnated mass, after impregnation. The greater the viscosity of the impregnating solution, the less is the tendency for it to gather in the cell corners. And the shorter the time the solution is permitted to remain as such in the mass before the film is deposited, the less is the tendency for it to gather in the cell corners. Finally, it has been found that the average size of the cells has an effect on the gathering tendency, the larger the cells are, the less is the tendency for the impregnating solution to gather in the cell corners.

One or more of the sides of each cell will be broken so that the internal cells or void spaces are inter-connected and there is access from one cell to another throughout the mass, and this condition is referred to herein as "open-celled." In the normal condition one or more sides of each cell in the foamed polymeric polyurethane mass is broken. Subsequent chemical treatment, as by the process of said copending application Serial No. 655,368 may break further sides. In fact such chemical treatment may effectively dissolve away all the sides of the cells leaving only the strands outlining the intersections of the sides. At any rate, whatever the nature of the exposed surfaces externally and within the foamed mass, it is the purpose of the present invention substantially to coat them.

Once the cellular mass has been impregnated with the solution, the hydrophilic material can be deposited on the cell surfaces by a wide variety of means. For example, it may be deposited through evaporation of the solvent from the mass after excess solution has been squeezed therefrom, or the hydrophilic material may be precipitated on the cell surfaces through dilution of the solvent with another liquid in which the hydrophilic material is insoluble. In this connection when the impregnating solution involves an organic solvent system, precipitation and deposition may be accomplished by dilution with water, and when the impregnating solution is an aqueous alkaline solution of the hydrophilic material, precipitation and deposition may be accomplished by neutralization with aqueous acid. This latter mechanism also serves to insolubilize the hydrophilic material. In the case of sodium cellulose xanthate, for example, cellulose is regenerated and serves as the hydrophilic coating. The deposition leaves a coating of the hydrophilic material on all surfaces of the polyurethane mass, that is on the surfaces of the void spaces, including cell sides and channels between the cells, within the mass, referred to herein briefly as internal cell surfaces.

The amount of hydrophilic material retained in the mass may vary widely since the initial foamed structure is essentially void space (90–97%, by volume, void space) and hence a large amount of hydrophilic material relative to the polymeric polyurethane itself, by weight, is permissible while still retaining the cellular structure. To provide a significant increase in hydrophilicity and capillar-active effect toward water, only a very thin film of hydrophilic material need be retained on the cell surfaces, and this may amount to as little as about 2%, by weight, of hydrophilic material based on the weight of the polymeric polyurethane. It may be desirable, however, to retain much larger amounts of hydrophilic material so that the resulting product is essentially the hydrophilic material supported by a skeletal framework or network of the polymeric polyurethane. In this case, the amount of hydrophilic material may be as high as about 4 to 5 times that of the polyurethane on a weight by weight basis.

The amount of hydrophilic material incorporated in the foamed cellular structure will determine to some extent the "hand" or feel and other physical characteristics of the resulting product. For example, with only minor amounts, in the lower portion of the above-mentioned range, the original "handle" of the cellular material is not materially altered. However, the more hydrophilic material incorporated in the cellular structure the more the original "handle" of the cellular material is altered through filling of the voids. The amount of hydrophilic material deposited upon the cell surfaces and retained within the mass can readily be controlled through variations in the concentration of the solution, amount of working, amounts of solution retained, number of applications, and the like.

The resulting product as diagrammatically illustrated in Figure 1, thus comprises an open-cell, cellular polymeric polyurethane structure 2 the surfaces of which have a coating thereon of water-insoluble hydrophilic material 1. One characteristic of the product is that the hydrophilic material will not readily leach out of the product during use. Moreover, when an organic solvent system is employed, since the organic liquid generally exerts a swelling action on the polyurethane, it is believed that a portion of the hydrophilic material diffuses into the polyurethane, and, upon removal of the solvent, becomes mechanically locked into the polyurethane mass thereby enhancing the adhesion of the coating to the polyurethane.

The following examples illustrate the present invention but are not intended to limit the scope of the invention in any way.

EXAMPLE I

Component A

Into a closed container equipped with an agitator and means for maintaining a nitrogen gas sweep are charged, at room temperature, 50 parts, by weight, of "Hylene TM," an approximately 80:20 isomeric mixture of toluene-2,4-diisocyanate and toluene-2,6-diisocyanate sold by E. I. du Pont de Nemours & Co., Inc., Wilmington, Delaware, and 50 parts, by weight, of "Paraplex U-148," a polyester resin (alkyd), sold by Rohm and Haas Company, Philadelphia, Pa., having the following properties:

| | |
|---|---|
| Number average molecular weight | 1800–2000 |
| Equivalent weight | 745–830 |
| Hydroxyl number | 65–75 |
| Acid number maximum | 3 |
| Water content percent maximum | 0.25 |
| Average hydroxyls per molecule | 2.42 |

The above-described mixture is agitated under a maintained nitrogen atmosphere for four hours, the temperature rising to approximately 40° C.

Component B

There are blended at room temperature: 80.5 parts, by weight, of the polyester resin (alkyd) referred to above, 0.6 part, by weight, of "Emulphor EL-719," a nonionic polyoxyethylated vegetable oil dispersing agent sold by General Aniline and Film Corp., New York City, N.Y., 4.5 parts, by weight, of water and 1.9 parts, by weight, of diethylethanolamine.

100 parts, by weight, of component A are added to 87 parts, by weight, of component B, and thoroughly mixed for about 20 seconds at a starting temperature of about 25° C. The mixture is then immediately poured into a container of sufficient volume to permit expansion. After about 15 minutes the product sets to a cellular mass, the temperature rising to about 75° C. The container together with the foamed cellular mass is placed in an oven and held at 70° C. for approximately 16 hours. The product, in the form of an open-cell, foamed mass and having carboxylic ester linkages, is removed from the container and cut into blocks.

The blocks have a density of 0.047 gram per cubic centimeter, and the tensile strength of the foamed material is 2.0 kilograms per square centimeter. Softness, as measured by the penetration of a 12.7 mm. diameter steel hemisphere under a total load of 300 grams, is 4 mm. The proportion of closed holes in the product is very small, the cells having an approximate diameter of 0.3 mm.

A block of this open-celled, polymeric polyurethane cellular product 12.5×7.5×2.5 cms. prepared as described above is immersed in a bath at a temperature of 25° C. composed of:

|  | Parts by weight |
|---|---|
| Cellulose acetate (27% acetyl) | 25 |
| Water | 487 |
| Acetone | 487.5 |

The block is compressed repeatedly in this bath until it is thoroughly saturated and swollen with the solution. The block is then removed from the bath and the impregnating liquid squeezed out until the liquid remaining amounts to about three times the dry weight of the original block. The squeezed block is then placed in an oven held at 120° C. and held there for 2 hours. The effect of treatment is as follows:

The increase in dry weight of the block is 7.1%. Before treatment the dry softness was 4 mm., the west softness was 8 mm. and the hydrophilicity was 12%, and after treatment the dry softness is 4 mm., the wet softness is 8 mm. and the hydrophilicity is 78%. The handle of the block is practically identical to that of the original block.

Hydrophilicity is measured herein as follows: a block of the cellular mass to be tested (of a size 12.5×7.5×2.5 cms.) is squeezed several times under water. The block is withdrawn and excess water is removed by manually squeezing, and the weight of the wet squeezed block is noted. 30 ml. of water are poured onto a flat sheet of polystyrene to make a puddle. The block is gently placed on the puddle, large face down, for a period of five seconds. The block is again weighed. The amount of water absorbed is calculated and recorded as percent of the original 30 ml.

EXAMPLE II

In this example a block prepared as in Example I and having the same dimensions is employed and is treated in accordance with the procedure of Example I except that the impregnated block, after squeezing out excess impregnating solution until the liquid remaining amounted to about three times the dry weight of the untreated block, is immersed in water and squeezed to coagulate the cellulose acetate instead of heating for two hours at 120° C. The squeezed block is then placed in an oven held at 120° C. for two hours. The results are as follows:

The increase in dry weight of the block is 6.7%; the hydrophilicity is 89%, and the handle is practically identical to that of the original block.

EXAMPLE III

In this example a block of open-cell, foamed polyurethane material prepared as in Example I and having the same dimensions is immersed at 25° C. in a bath composed of the following:

|  | Parts by weight |
|---|---|
| Cellulose acetate (27% acetyl) | 25 |
| Water | 487.5 |
| Dimethylformamide | 487.5 |

The block is kneaded in the bath until it is thoroughly saturated with the solution. The block is then removed from the bath and squeezed until the weight of the remaining liquid amounts to approximately three times the weight of the dry untreated block. The impregnated block is then immersed and repeatedly squeezed in water to insure thorough penetration of the water which results in coagulation of the cellulose acetate. The block is then oven dried at 120° C. for two hours.

The results are as follows: The increase in dry weight is 8.2%. The dry softness is 5 mm., the wet softness is 11 mm. and the hydrophilicity is 88%.

EXAMPLE IV

In this example a block of open-celled, foamed polyurethane material, prepared as in Example I, and having the same dimensions, is immersed at room temperature in a bath having the following composition:

|  | Parts by weight |
|---|---|
| "G-942," an interpolymer of maleic acid and styrene as described in U.S. Patent 2,205,882 and sold by E. I. du Pont de Nemours & Co., Inc., Wilmington, Delaware | 25 |
| Water | 487.5 |
| Acetone | 487.5 |

The block is kneaded in the bath until it is thoroughly saturated with the solution. It is then removed from the bath and squeezed until the weight of liquid remaining in the block amounts to approximately three times the weight of the dry untreated block. The thus impregnated block is then immersed at room temperature and repeatedly squeezed in a solution of the following composition:

|  | Parts by weight |
|---|---|
| Aluminum sulphate | 100 |
| Water | 900 |

This treatment effectively water-insolubilizes the interpolymer of maleic acid and styrene. Finally the sponge block is washed well with water and oven dried at 120° C. for two hours.

The results are as follows: The increase in dry weight is 7.8%. The dry softness is 5 mm., the wet softness is 10 mm. and the hydrophilicity is 90%.

The handle is practically identical to that of the original block although somewhat softer.

EXAMPLE V

Component A

Into a closed container equipped with an agitator and means for maintaining a nitrogen sweep are charged 105 parts by weight of the mixture of toluene-2,4-diisocyanate and toluene-2,6-diisocyanate employed in Example I, the temperature being adjusted to 35° C. and then 800 parts, by weight, of "Teracol–30," a polyalkylene ether glycol having a hydroxyl number of 36–38 sold by E. I. du Pont de Nemours & Co., Inc., Wilmington, Delaware, are added the latter being at a temperature of about 40° C. This mixture is agitated for 20 hours at a temperature of 30–40° C. under nitrogen sweep. 100 parts additional toluene-2,4-diisocyanate-toluene-2,6-diisocyanate mixture are then added and the temperature is raised to 140° C. for two hours. This reaction mass is then cooled to 50° C., and 61 parts, by weight, of additional toluene - 2,4 - diisocyanate-toluene-2,6-diisocyanate mixture are added and the material mixed for two hours. The resulting material is then cooled to 25° C.

*Component B*

In a separate vessel are blended at room temperature 246 parts, by weight, of water; 108 parts, by weight, of n-methyl morpholine; and 31 parts, by weight, of the nonionic polyoxyethylated vegetable oil employed in Example I.

3.62 parts, by weight, of component B are thoroughly mixed with 100 parts, by weight, of component A for about 25 seconds at an initial temperature of about 25° C., and immediately thereafter the mixture is poured into a container of sufficient volume to permit expansion. The temperature rises to 70° C. After about 30 minutes, the container together with the foamed mass is heated in an oven at 70° C. for about 16 hours. The foamed mass is then removed from the container and cut into blocks.

The resulting open-celled foam has a density of 0.05 grams per cubic centimeter, a tensile strength of 2.2 kilograms per square centimeter, and a dry softness of 8 mm.

A block of this polyether polyurethane foam, 12.5×7.5×2.5 cm., is immersed in a bath, at 25° C., composed of the following:

| | Parts by weight |
|---|---|
| Cellulose acetate (27% acetyl) | 25 |
| Water | 487.5 |
| Acetone | 487.5 |

The block is immersed in the above bath and is repeatedly squeezed to saturate it with the solution. The block is then removed from the bath and is squeezed until the remaining liquid is equal to about three times the dry weight of the untreated block. The block is then immersed in water and squeezed to insure complete insolubilization of the cellulose acetate. The sponge is then worked well in cold water and dried for 2 hours at 120° C.

The results are as follows: Before treatment the dry softness is 8 mm., the wet softness is 13 mm. and the hydrophilicity is 11%; after treatment the dry softness is 8 mm., the wet softness is 13 mm. and the hydrophilicity is 85%.

EXAMPLE VI

In this example the following materials are blended together at room temperature:

40 parts, by weight, of the polyester resin (alkyd) employed in Example I; 0.04 part, by weight, of the nonionic polyoxyethylated vegetable oil employed in Example I; 1.1 parts, by weight, of water, and 0.4 part, by weight, of diethylethanolamine.

To the resulting mixture are then added 15 parts, by weight, of the 80:20 isomeric mixture of toluene-2,4-diisocyanate and toluene-2,6-diisocyanate employed in Example I.

The resulting combination is mixed thoroughly with rapid agitation for 20 seconds, and immediately poured into a container of sufficient volume to permit expansion, the temperature rising to about 85° C. After about 15 minutes, the container including the foamed mass is placed in an oven and maintained at 70° C. for 16 hours. The foam is then removed from the container and cut into blocks.

The density of the foam is 0.045 gram per cubic centimeter; the tensile strength is 2.0 kilograms per square centimeter (28.5 p.s.i.), and the dry softness is 5 mm. The proportion of closed cells is very small, the pores having an average diameter of 0.3 mm.

A block of this cellular material, 12.5×7.5×2.5 cms., is immersed at room temperature in a bath having the following composition:

| | Parts by weight |
|---|---|
| Cellulose acetate (27% acetyl) | 25 |
| Water | 487.5 |
| Acetone | 487.5 |

The block is compressed repeatedly in the bath until it is thoroughly saturated and swollen. It is then removed from the bath, squeezed until the weight of liquid adhering amounts to about three times the dry weight of the block. It is then placed in an oven and dried for about 2 hours at 120° C.

The results are as follows: Before treatment the dry softness is 5 mm., the wet softness is 12 mm., and the hydrophilicity is 12%; after treatment the dry softness is 5 mm., the wet softness is 12 mm. and the hydrophilicity is 80%.

EXAMPLE VII

A block of open-celled, cellular polyurethane of the type prepared in Example I and having the same dimensions is immersed in a bath, at 22° C., composed of:

| | Parts by weight |
|---|---|
| The maleic acid-styrene interpolymer employed in Example IV | 100 |
| Ethyl alcohol | 450 |
| Water | 450 |

The block is kneaded while immersed in the bath until it is thoroughly saturated with the solution. The block is removed from the bath and squeezed until the weight of the liquid remaining in the block amounts to about three times the weight of the dry untreated block.

The block is then immersed and repeatedly squeezed in a solution composed of 100 parts, by weight, of aluminum sulfate and 900 parts, by weight, of water, to water-insolubilize the interpolymer. The block is then washed well with water and then oven dried at 120° C.

The results are as follows: Dry softness is 8 mm., wet softness is 11 mm. and hydrophilicity is 94.8%.

EXAMPLE VIII

A block of open-celled polymeric polyester polyurethane prepared as in the first section of Example I and having dimensions of 12.5×7.5×2.5 cms. is immersed in a bath, at 50° C. composed of:

| | Parts by weight |
|---|---|
| Sodium hydroxide | 100 |
| Water | 900 |

The block is compressed repeatedly to insure thorough penetration of the solution. After five minutes it is removed and squeezed repeatedly in water to remove the sodium hydroxide solution. It is then squeezed repeatedly in dilute acetic acid to neutralize any residual sodium hydroxide, and is finally washed again with water.

The effect of this treatment, which is the subject matter of copending application Serial No. 591,623, is as follows: Dry softness is 8 mm., wet softness is 11 mm. and hydrophilicity is 87%.

The block before and after treatment is subjected to a wiping test as follows: The block is impregnated with water, and then squeezed to remove excess water. Two ml. of water are pipetted onto a flat sheet of polystyrene and spread out into thin streaks and droplets over an area of about one square foot by means of a rubber squeegee. Using a natural motion and hand pressure, the water is then wiped-up with the block broad surface down. The time of wiping required to give an apparently dry surface is noted and recorded. Results are expressed as ml. of water wiped per minute per 100 square centimeters of block area.

The results of this wiping test are as follows: Before treatment, 0–1 ml./min./100 cm.$^2$; after treatment, 0–1 ml./min./100 cm.$^2$.

The block is then immersed in a bath, at a temperature of 25° C., composed of:

| | Parts by weight |
|---|---|
| Hydroxyethyl cellulose, D.S.O. 18 ("Ceglin," type H, low viscosity of the American Viscose Corp.) | 60 |
| Sodium hydroxide | 80 |
| Water | 860 |

The block is compressed repeatedly in this bath for about 30 seconds until it is thoroughly saturated with the solution. The block is then removed from the bath, and the impregnating solution is squeezed out until the liquid remaining amounts to about 1.75 times the weight of the dry block. The block is then immersed without squeezing in a bath, at a temperature of 35° C., composed of

| | Parts by weight |
|---|---|
| Sulfuric acid | 50 |
| Water | 950 | and allowed to rest quietly in this bath for about one minute. It is then compressed repeatedly in this bath. The block is then removed from the bath and washed well with water following which residual sulfuric acid in the block is neutralized with a solution of sodium bicarbonate and the block is again washed with water. The block is then dried for three hours in a forced circulation oven at 70° C.

The results are as follows: The increase in the dry weight of the block is 9.8%. The dry softness is 8 mm., the wet softness is 11 mm., the hydrophilicity is 92%, and the wiping power is 5–6 ml./min./100 cm.$^2$.

When the block is impregnated with the hydroxyethyl cellulose in accordance with this example without, however, preliminary hydrolysis with sodium hydroxide, the results are as follows: dry softness is 5 mm., wet softness is 9 mm., hydrophilicity is 14%, and wiping power is 0–1 ml./min./100 cm.$^2$.

EXAMPLE IX

A block of open-celled polymeric polyester polyurethane prepared as in the first section of Example I and hydrolyzed with sodium hydroxide as in the first section of Example VIII is immersed in a bath at 25° C., composed of:

| | Parts by weight |
|---|---|
| Viscose solution | 857 |
| Water | 143 |

The viscose solution is prepared according to the directions given on page 960 of "High Polymers," vol. V, Emil Ott, editor, 2nd edition, published by Interscience Publishers, Inc.

The block is compressed repeatedly for about 30 seconds until it is thoroughly saturated with the solution. The block is then removed from the bath and the impregnating solution squeezed out until the liquid remaining amounts to about 1.75 times the weight of the dry block. The block is then immediately immersed without squeezing in a bath, at a temperature of 35° C., composed of 50 parts by weight of sulfuric acid, 100 parts by weight of sodium sulfate (anhydrous) and 850 parts by weight of water, and allowed to rest quietly in this bath for about one minute. It is then compressed repeatedly to insure thorough penetration of the acid solution. The block is then removed and washed well with water, then washed with sodium bicarbonate solution and again with water. Finally it is dried for three hours in a forced circulation oven at 70° C.

The results are as follows: Dry softness, 8 mm., wet softness, 11 mm., hydrophilicity, 94%, and wiping power, 6–7 ml./min./100 cm.$^2$.

EXAMPLE X

A block of open-celled polymeric polyurethane prepared as in the first section of Example VI is hydrolyzed with sodium hydroxide as in the first section of Example VIII. The results are as follows: Dry softness, 10 mm., wet softness, 15 mm., hydrophilicity, 88%, and wiping power, 0–1 ml./min./100 cm.$^2$.

The block is then treated with hydroxyethyl cellulose as in Example VIII. The results are as follows: dry softness, 10 mm., wet softness, 15 mm., hydrophilicity, 93%, and wiping power, 5–6 ml./min./100 cm.$^2$.

EXAMPLE XI

A block of open-celled polymeric polyurethane prepared as in the first section of Example VI is hydrolyzed in a bath, at 35° C., composed of:

| | Parts by weight |
|---|---|
| Sodium hydroxide | 600 |
| Acetone | 1580 |
| Water | 3000 | until the block, after neutralization with dilute acetic acid, washing with water and drying, has a density of 0.041, a dry softness of 11 mm., a wet softness of 12 mm., and a hydrophilicity of 90%. The block also has a wiping power of 1 ml./min./100 cm.$^2$.

The block is then immersed in a 6% solution of hydroethyl cellulose (the same as employed in Example VIII) in 8% caustic. The block is compressed repeatedly to insure thorough impregnation of the block by the solution, after which the block is immersed without squeezing in a sulfuric acid solution (prepared by dissolving 5 parts by weight of 96.3% reagent grade sulfuric acid in 95 parts of water) to precipitate and deposit the hydroxyethyl cellulose. The block is then washed with water and dried. This treatment is repeated three more times, so that the block receives a total of four separate impregnations.

The results are as follows: density, 0.081; dry softness, 7 mm.; wet softness, 9 mm.; hydrophilicity, 92.8%, and wiping power, 6 ml./min./100 cm.$^2$.

EXAMPLE XII

A block of open-celled polymeric polyester polyurethane cellular product prepared as in the first section of Example VI is immersed in a bath, at 90° C., composed of 100 parts by weight of trisodium phosphate and 900 parts of water. The block is compressed repeatedly while immersed to insure thorough penetration of solution into the block. After 20 minutes, the block is removed from the bath and squeezed repeatedly in water.

The results are as follows: dry softness, 8 mm.; wet softness, 13 mm.; hydrophilicity, 86.5%, and wiping power, 1.5 ml./min./100 cm.$^2$.

The block is then immersed in a bath, at 25° C., composed of 60 parts by weight of the hydroxyethyl cellulose employed in Example VIII, 80 parts of sodium hydroxide and 860 parts of water. The block is compressed repeatedly for about 30 seconds until it is thoroughly saturated with the solution. The block is then removed from the bath, and the impregnating solution squeezed out until the liquid remaining in the block amounts to about 1.75 times the weight of the dry block.

The block is then immersed without squeezing in a bath at 35° C., composed of 50 parts by weight of concentrated sulfuric acid and 950 parts of water, and allowed to rest quietly in this bath for about a minute. Then it is compressed repeatedly in the bath, removed and washed well with water. The residual acid is neutralized with a solution of sodium bicarbonate, and the block is again washed with water. The block is then dried for three hours in a forced circulation oven at 70° C.

The results are as follows: the increase in weight of the dry block is 9.4%; dry softness, 8 mm.; wet softness, 13 mm.; hydrophilicity, 94%, and wiping power, 6 ml./min./100 cm.$^2$.

EXAMPLES XIII–XXII

Blocks of open-celled polymeric polyester polyurethane prepared as in the first section of Example I are partially hydrolyzed in aqueous sodium hydroxide to varying degrees of hydrophilicity as set forth in the following table. Five blocks, designated as blocks XIII to XVII, and having hydrophilicities of 24%, 27.5%, 35%, 45% and 67.5%, respectively, are impregnated with a 4.5% solution of hydroxyethyl cellulose in 6% aqueous sodium hydroxide as in the preceding examples. Three blocks, designated as blocks XVIII to XX, and having hydrophilicities of 24%, 27.5% and 35%, respectively, are impregnated with a 4.5% solution of hydroxyethyl cellulose in 6% aqueous sodium hydroxide which contains 0.04% of polyethylene glycol tertdodecyl thioether ("Nonic 218" of Sharples Chemicals, Inc.) as in the preceding examples. And two blocks, designated XXI and XXII, and having hydrophilicities of 24% and 27.5%, respectively, are impregnated with a solution containing 4.5% hydroxyethyl cellulose, 6% of sodium hydroxide, 8% of acetone and 81.5% of water as in the preceding examples.

The results as far as increased hydrophilicity is concerned are set forth in the following table:

| Block | Initial Hydrophilicity, Percent | Final Hydrophilicity, Percent |
| --- | --- | --- |
| XIII | 24 | 39 |
| XIV | 27.5 | 65 |
| XV | 35 | 79 |
| XVI | 45 | 84.5 |
| XVII | 67.5 | 87.5 |
| XVIII | 24 | 55 |
| XIX | 27.5 | 75 |
| XX | 35 | 84 |
| XXI | 24 | 69 |
| XXII | 27.5 | 86 |

In these examples we have described products of an average cell size of about 0.3 millimeter. We have, however, also treated products having an average cell size of 0.05 to 5 millimeters. The pore size of these cellular products can be controlled by means well known in the art. Cellular products having cell sizes of the range 0.05 to 2 millimeters and treated according to the present process have been found to be of a sponge-like nature, that is to say, they will imbibe and hold water.

Considerable modification is possible in the selection of the hydrophilic material, solvent system and mode of treatment without departing from the scope of the present invention.

We claim:
1. The method of improving the spongiform characteristics of open-celled, cellular structures of foamed polymeric polyurethanes which comprises impregnating said structure with a solution of hydrophilic material capable of wetting the internal cell surfaces of said structure, and depositing the hydrophilic material in adherent, water-insoluble form, on the external and internal cell surfaces of said structure.

2. The method of imparting hydrophilicity to a hydrophobic, open-cell, cellular structure of foamed polymeric polyurethane which comprises impregnating said structure with a solution of hydrophilic material in an organic solvent system capable of wetting the internal cell surfaces of said polymeric polyurethane, and depositing said hydrophilic material, in water-insoluble form, on the external and internal surfaces of said structure.

3. The method of claim 2 wherein said hydrophilic material is partially hydrolyzed cellulose acetate.

4. The method of improving the spongiform characteristics of open-celled, cellular structures of foamed polymeric polyurethane having a hydrophilicity above about 40%, which comprises impregnating said structure with a substantially aqueous solution of a polymeric organic material having, in the form of a film, an advancing contact angle against water of below about 45°, and depositing said hydrophilic material, in adherent, substantially water-insoluble form, on the external and internal cell surfaces of said structure.

5. The method of improving the hydrophilicity and wiping characteristics of open-celled, cellular structures of foamed polymeric polyester polyurethane which comprises subjecting said structure to carboxylic ester hydrolytic saponification conditions and discontinuing the treatment while maintaining the cellular structure, then coating the external and internal cell surfaces with an adherent, water-insoluble hydrophilic material.

6. The method of claim 5 wherein the hydrophilic material comprises hydroxyethyl cellulose.

7. A sponge-like article capable of imbibing and holding water comprising an open-cell, cellular mass of foamed polymeric polyurethane, the external and internal cell surfaces of which are coated with an adherent, water-insoluble hydrophilic material.

8. The product of claim 7 wherein said hydrophilic material comprises partially hydrolyzed cellulose acetate.

9. A sponge-like article capable of imbibing and holding water comprising partially hydrolyzed polymeric polyester polyurethane in the form of an open-celled, cellular foamed structure, the external and internal cell surfaces of said structure having an adherent coating thereon of a substantially water-insoluble hydrophilic material.

10. The product of claim 9 wherein said hydrophilic material comprises hydroxyethyl cellulose.

References Cited in the file of this patent
UNITED STATES PATENTS

| | | |
| --- | --- | --- |
| 2,103,640 | Richter | Dec. 28, 1937 |
| 2,205,882 | Graves | June 25, 1940 |
| 2,339,562 | Eustis | Jan. 18, 1944 |
| 2,577,279 | Simon et al. | Dec. 4, 1951 |
| 2,729,618 | Muller et al. | Jan. 3, 1956 |
| 2,753,277 | Smithers | July 3, 1956 |
| 2,790,736 | McLaughlin | Apr. 30, 1957 |

OTHER REFERENCES

Noller: "Chemistry of Organic Compounds," copyright 1951 pages 169–170.